United States Patent
Swartzlander

[11] Patent Number: 5,853,189
[45] Date of Patent: Dec. 29, 1998

[54] CART

[76] Inventor: Curt Swartzlander, 25060 Benning Rd., Centralia, Ill. 62801

[21] Appl. No.: 623,333

[22] Filed: Mar. 27, 1996

[51] Int. Cl.[6] ....................................................... B62B 1/04
[52] U.S. Cl. ..................... 280/652; 280/659; 280/47.24
[58] Field of Search .............................. 280/638, 35, 639, 280/651, 652, 359, 656, 47.17, 47.19, 47.24, 47.26

[56] References Cited

U.S. PATENT DOCUMENTS

| | | | |
|---|---|---|---|
| 2,613,307 | 10/1952 | Marand | 280/652 |
| 3,222,100 | 12/1965 | Lindzy . | |
| 4,061,360 | 12/1977 | Evans et al. . | |
| 4,126,324 | 11/1978 | Browning . | |
| 4,253,677 | 3/1981 | Wissler . | |
| 4,286,800 | 9/1981 | Lomas . | |
| 4,511,181 | 4/1985 | Schantz . | |
| 4,582,333 | 4/1986 | Doering . | |
| 4,671,530 | 6/1987 | van der Wouden . | |
| 4,789,180 | 12/1988 | Bell . | |
| 4,887,836 | 12/1989 | Sinjian | 280/651 |
| 4,958,846 | 9/1990 | Greenberg . | |
| 5,154,941 | 10/1992 | White et al. | 280/652 |
| 5,192,092 | 3/1993 | Di Benedetto | 280/652 |
| 5,197,754 | 3/1993 | Ward . | |
| 5,330,212 | 7/1994 | Gardner . | |
| 5,340,134 | 8/1994 | Dodson . | |
| 5,474,316 | 12/1995 | Britton . | |

OTHER PUBLICATIONS

*Gander Mountain*, Warren & Sweat "Mule"Big Game Carrier, p. 232, Fall 1994.
*Gander Mountain*, Warren & Sweat Horse, p. 232, Fall 1994.
*Gander Mountain*, Warren & Sweat Pony, p. 232, Fall 1994.

*Primary Examiner*—Richard M. Camby
*Attorney, Agent, or Firm*—Kalish & Gilster

[57] ABSTRACT

The invention is a cart assembly having an upper and a lower deck whose body may be assembled in a single procedure using only one hand and whose body including the wheels can collapse to fit behind the driver's seat of a standard cab version of any size pickup truck. Specifically, a plurality of spacing members rotatably connected between the upper deck and lower deck rotate to alternately collapse and expand the cart. The cart is held in a fixed position by a brace member disposed diagonally between the upper deck and lower deck in the expanded position of the cart, and which is disposed in parallel to the upper deck and lower deck when the cart assumes its collapsed position. The brace member fixes the relative positions of the upper deck and the lower deck as the brace member has a length (and thus radius of curvature) unequal to the length (and thus radius of curvature) of the spacing member.

8 Claims, 2 Drawing Sheets

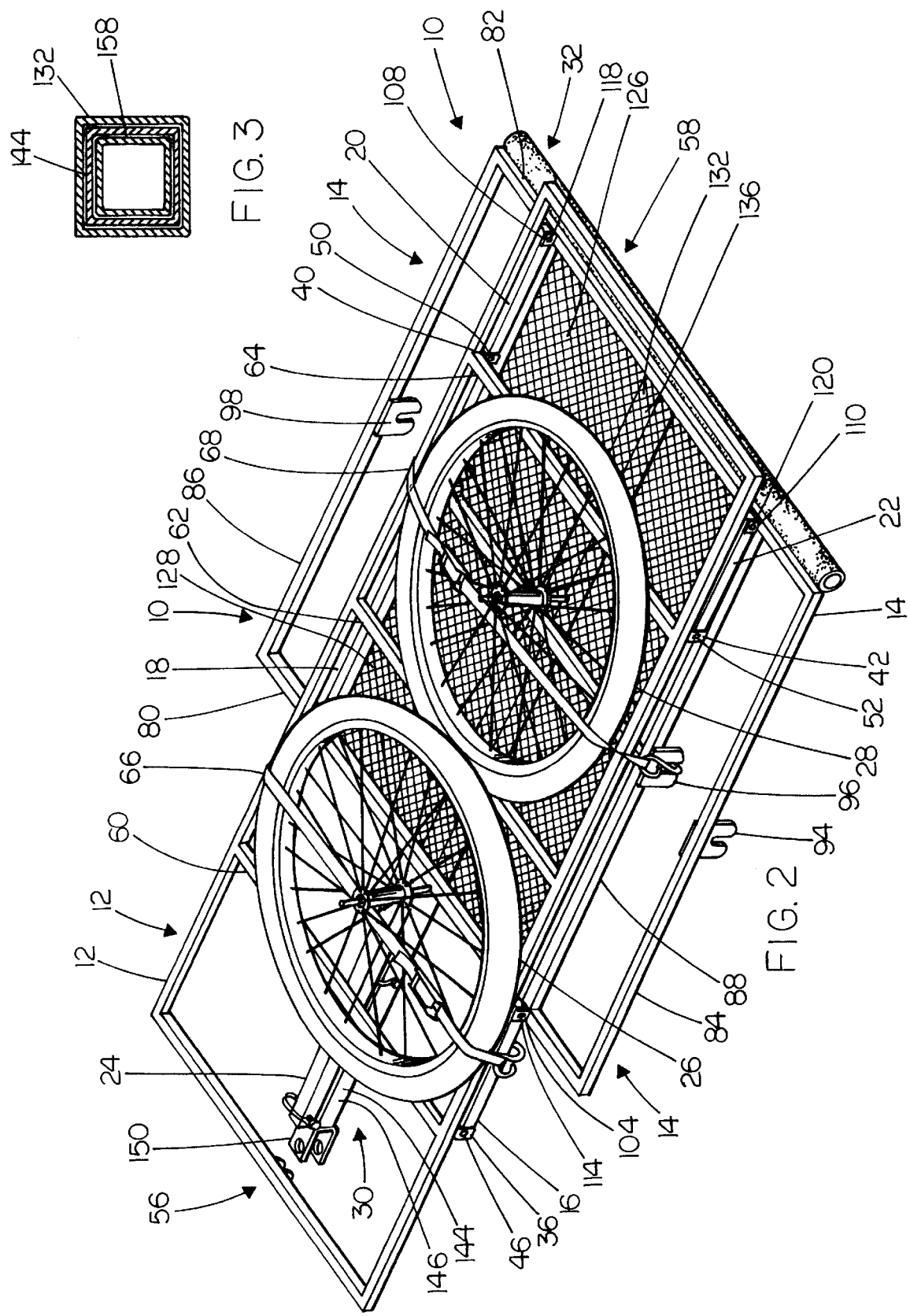

CART

BACKGROUND OF THE INVENTION

1. Field of the Invention

This invention relates to carrying devices and, more particularly, carts for carrying heavy loads.

2. Related Art

The construction of carts is well-known in the art. Specifically, cart constructions which utilize a rigid, immovable body mounted on wheels is typical of the art. For example, the Gander Mountain catalog, Fall 1994, which is hereby incorporated by reference in its entirety, discloses a Warren and Sweat Horse cart model with a single carrying deck and a rigid, immobile body.

However, a need arose in the art to provide carts which could be safely used and use a minimum of storage space. Accordingly, various types of carts were devised in which the rigid, immobile body was divided into several independent sections. The independent sections were removably connected to minimize storage space. For example, the Gander Mountain Fall 1994 catalog, which is hereby incorporated by reference in its entirety, discloses a Warren and Sweat Mule Big Game Carrier Cart and a Warren and Sweat Pony Cart, both of which utilize a single carrying deck and a rigid body. However, both of these carts are collapsible in the sense that they are comprised of independent sections which are removably connected to one another. In other words, the independent sections are separated to reduce storage space.

However, the fact that the independent cart sections of the prior art are completely removable is inconvenient because a relatively high degree of care and physical coordination is required to ensure that the sections are attached. Thus, assembling the cart sections is a multiple step procedure even for those carts which only have a single deck, and thus there is a need in the art to provide a cart whose body may be assembled in a single procedure.

While the carts of the prior art are constructed from removable sections, the prior art has constructed the sections such that the cart may be placed in the bed of a pickup truck or the rear-most section of a sport utility vehicle. However, none of the carts in the prior art have been designed to fit behind the driver's seat of a standard cab (non-extended cab) version of a full-sized or even small-sized pickup trucks. Accordingly, there is a need in the art to provide a cart having an upper and a lower deck whose body may be assembled in a single procedure and whose body can collapse to fit behind the driver's seat of a standard cab version of any size pickup truck.

SUMMARY OF THE INVENTION

It is in view of the above problems that the present invention was developed. The invention is a cart assembly having an upper and a lower deck whose body may be assembled in a single procedure using only one hand and whose body including the wheels can collapse to fit behind the driver's seat of a standard cab version of any size pickup truck. Specifically, a plurality of spacing members rotatably connected between the upper deck and lower deck rotate to alternately collapse and expand the cart. The cart is held in a fixed position by a brace member disposed diagonally between the upper deck and lower deck in the expanded position of the cart, and which is disposed in parallel to the upper deck and lower deck when the cart assumes its collapsed position. The brace member fixes the relative positions of the upper deck and the lower deck as the brace member has a length (and thus radius of curvature) unequal to the length (and thus radius of curvature) of the spacing member.

In its collapsed state, the cart may assume the dimensions of 42½×7×27½ inches, including the provision of a hitch for towing and a t-bar for manual pushing.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 illustrates the cart of the present invention in kit form;

FIG. 3 illustrates a cross-sectional view of the lower portion of the cart of the present invention.

DETAILED DESCRIPTION OF THE PREFERRED EMBODIMENTS

Figure 1:
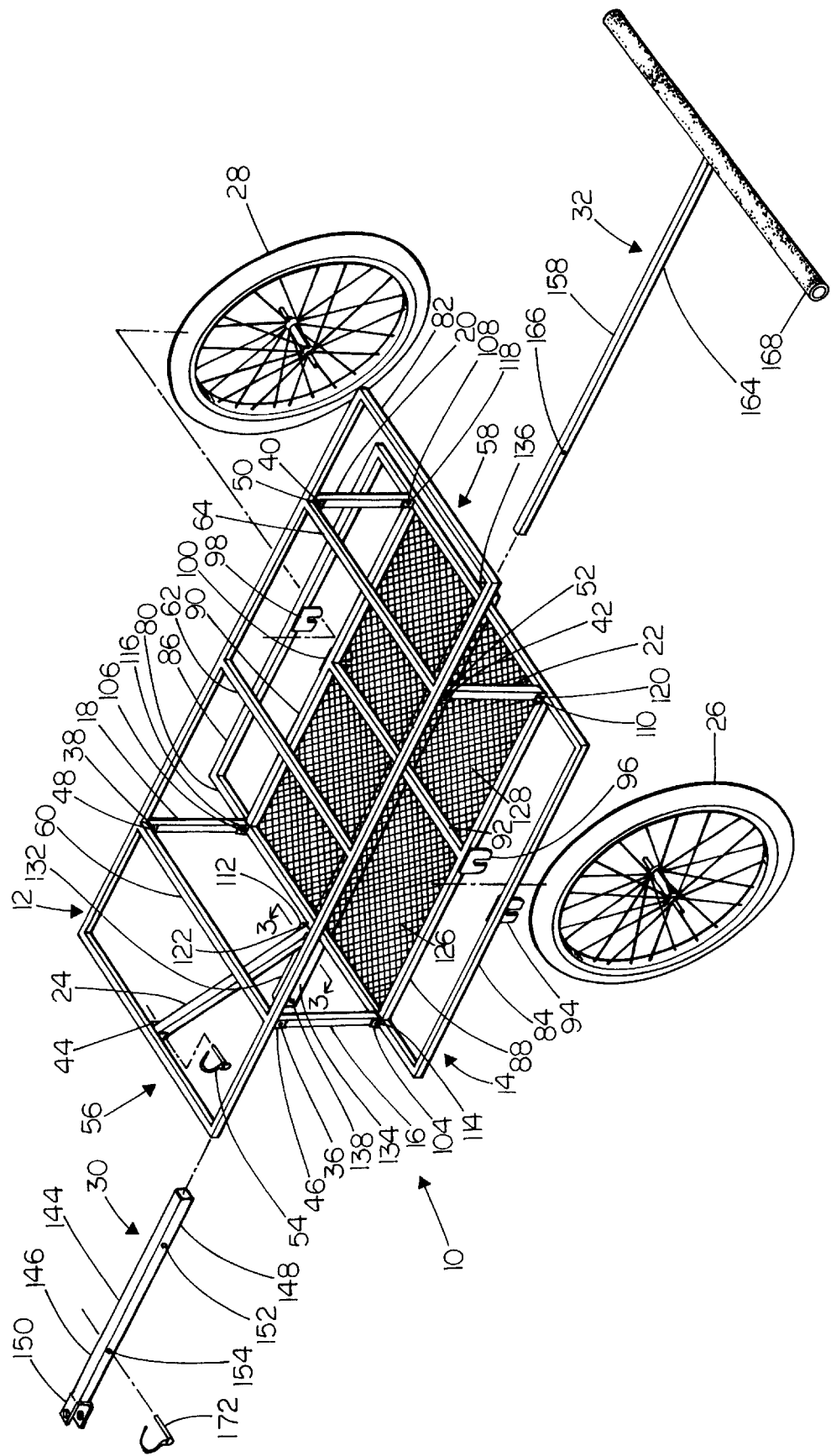
FIG. 1 illustrates an exploded view of the cart of the present invention.

Referring to the accompanying drawings in which like reference numbers indicate like elements, FIG. 1 illustrates an exploded view of the cart, shown generally at 10, of the present invention. Cart 10 comprises upper deck shown generally at 12, lower deck shown generally at 14, first, second, third, and fourth upright members 16–22, respectively, spacing upright member 24, wheels 26–28, hitch shown generally at 30, and T-bar shown generally at 32.

First, second, third, and fourth upright members 16–22, respectively, are made from ¾ inch square tube which may be 8½ inches long with a square or straight cut and have ¼ inch holes drilled through at each end approximately 5/16 of an inch from each of the ends. Preferably, where square tube is used, steel square tube is preferred, although other square tube materials may be used such as aluminum or fiberglass. Spacing upright member (or brace) 24 is made from 1 inch square tube and may be 12½ inches long having ¼ inch holes drilled through each end approximately 5/16 of an inch from each of the ends. Although spacing upright member 24 may be of variable size, it cannot be the same length as first, second, third, and fourth upright members 16–22. Preferably, spacing upright member 24 is longer than any of upright members 16–22 to ensure that the relative rotation radii of the respective members are not the same or similar.

Upper deck 12 comprises a four "panel" grid which is rigid and immobile. Upper deck 12 further comprises five inverted U-shaped connectors 36–44 adapted to receive a pin 46–54. The upper deck 12 is 42 inches long and 18 inches wide in overall dimensions. The "panel" nearest the front, shown generally at 56, and nearest the rear, shown generally at 58, of cart 10 may be 8¼ inches wide between the panel separating numbers. The last two remaining interior "panels" may be 11 inches wide. Upper deck 12 is constructed from ¾ inch square steel tube. In constructing upper deck 12, the 42 inch square tube lengths are cut with 45° angles at the ends. Similarly, the 18 inch width square tube lengths are cut with 45° angles at the ends. The three upper deck interior members 60–64 may be each 16½ inches long with straight or square cuts at each end. The square tube members comprising the upper deck are joined in a rigid immobile relationship by welding.

U-shaped connectors 36–44 have a square U-shape and are constructed from 1/16 inch plate steel, with a 1 inch outer dimension on each side of the U-shape. A ½ inch hole is drilled near the end of each of the legs of each of the U-shaped connectors 36–44 namely, each hole is centered 7/16 of an inch from the end of each leg. The holes in each U-shaped connector 36–44 function to receive first, second, third, and fourth pins 46–52. First, second, third, fourth, and fifth pins 46–54 may take various forms such as bolts (with nuts), cotter pins, tapered pins, grooved pins, straight pins, spring pins, spiral pins, roll pins, slip pins, or the like.

Accordingly, upper deck 12 is pivotally and releasably connected to first, second, third, and fourth upright members 16–22, respectively, and spacing upright member 24 via first, second, third, fourth, and fifth U-shaped connectors 36–44, respectively, and first, second, third, fourth, and fifth pins 46–54, respectively, simultaneously disposed through both of the holes in U-shaped connectors, as well as the holes in each of the upright members 16–24.

Similarly, lower deck 14 comprises a four "panel" grid and may assume overall dimensions of 27 inches by 24 inches. The width of the two interior "panel" members of lower deck 14 is substantially congruent with the width of upper deck 12. In addition, the length of the two interior "panel" members of lower deck 14 is substantially congruent with the length of the two interior "panel" members of upper deck 12. Exterior "panel" members of lower deck 14 extend 5 inches from interior "panel" members. Accordingly, lower deck 14 is wider than upper deck 12 for stability. Lower deck 14 may be assembled using ¾ inch square tube, two 27 inch lengths, each having a 45° cut on each end, two 24 inch lengths, each having a 45° on each end, one 16½ inch length with straight or square cuts on each end for separating the two interior "panel" members of lower deck 14, two 22½ lengths with straight or square cuts on each end. The two 27 inch lengths form front member 80 and rear member 82. The two 24 inch lengths form side members 84 and 86. The two 22½ inch members form interior side members 88 and 90.

Along the same axis as middle member 92 are first, second, third, and fourth wheel mounts 94–100. The wheel mounts 94–100, respectively, are made from ⅛ inch thick plate steel of 2 inches by 2 inches in which a portion is cut out to receive wheels 26 and 28. The shape of the cutout may take various forms. For example, the cutout may be straight and rounded only at the end as shown in FIG. 1. Alternatively, the cutout may assume an "L" path for receiving wheels 26 and 28 equipped with a quick-release fastening mechanism. First, second, third, and fourth wheel mounts 94–100, respectively, are welded 1 each to side members 84 and 86, and interior side members 88 and 90, in parallel. Thus, first, second, third, and fourth wheel mounts 94–100 may easily receive wheels 26 and 28 without regard for the wheel fastener (i.e., quick release or nut and threaded axle) utilized.

Also disposed on lower deck 14 are sixth, seventh, eighth, ninth, and tenth U-shaped connectors 104–112, respectively. As in the upper deck, the U-shaped connectors 104–112 are provided with holes for receiving sixth, seventh, eighth, ninth, and tenth pins. Accordingly, first, second, third, and fourth upright members 16–22 and spacing upright member 24 are pivotally and releasably connected to lower deck 14 via sixth, seventh, eighth, ninth, and tenth pins 114–122 disposed through the holes in U-shaped connectors 114–112 and the holes in upright members 16–24. Accordingly, as shown in FIG. 2, when fifth pin 54 is released from spacing upright member (or brace) 24, spacing upright member 24 rotates downwardly toward lower deck 14. Concurrently, upper deck 12 rotates forwardly and downwardly until it comes into longitudinal contact with first, second, third, and fourth upright members 16–22, and spacing upright member 24. After strapping each wheel with first and second straps 66 and 68, the entire cart achieves a collapsed dimension less than or equal to 42½ inches by 27½ inches by 7 inches. These dimensions permit the collapsed cart to be conveniently placed behind the driver's seat of a non-extended cab pickup truck, either full-sized or small-sized pickup truck. Therefore, the present invention avoids the necessity of using cargo space in the rear of a truck for storing the cart.

As shown in FIG. 1, a first steel mesh portion 126 and second mesh portion 128 may be disposed in lower deck 14 as a front portion and rear portion, respectively.

Tongue brace 132 is connected to lower deck 14 and helps support first and second steel mesh portions 126 and 128. Tongue brace 132 is connected to lower deck 14 by welding in various locations. Tongue brace 32 has a front end 134 and a rear end 136 and may be made from 1¼ inch square tube, 32 inches long square cut at both ends, and provided with a ⅜ inch hole 138 centered 2½ inches from front end 134.

Tongue (or hitch) member 144 has a front end 146 and a rear end 148, and is constructed from 1 inch square tube 32 inches long. At front end 146 of tongue member 144, tongue element 150 is fixed by welding to tongue member 144. Tongue element 150 may be formed from ¼ inch thick steel plate bent into U-shaped with each leg of the U having ¾ hole drilled therethrough centered approximately 1 inch from the ends. Tongue member 144 may have a ¼ inch rear hole 152 drilled approximately 10½ inches from rear end 148 and a ¼ inch front hole 154 drilled approximately 24½ inches from rear end 148. Tongue member 144 is disposed inside tongue brace 132 as tongue member 144 is made from 1 inch square tube and tongue brace 132 is made from 1¼ inch square tube.

T-bar 32 comprises T-bar member 158 welded to T-handle 160. T-bar member 158 has a front end 162 and a rear end 164, and may be constructed from ¾ inch square tube 38 inches long. A ⅜ inch hole 166 is drilled through T-bar member 158 at front end 162 approximately 7½ inches from the end. T-handle 160 may be made from ¾ inch square tube 26¼ inches long and welded at its midpoint to rear end 164 of T-bar member 158. For ease of use, T-handle 160 may be covered with a cellular cushion 168 such as foam. In its storage position, front end 162 of T-bar member 158 is inserted into rear end 148 of tongue member 144, as T-bar member 158 is of ¾ inch square tube and tongue member 144 is of 1 inch square tube. Hole 166 of T-bar member 158, hole 154 of tongue member 144, and hole 138 of tongue brace 132 may be aligned for passage of eleventh pin 172 therethrough. Accordingly, tongue member 144 and T-bar 32 remain fixed relative to cart 10 while in its collapsed state shown in FIG. 2.

The concentric nature of tongue brace 132 encompassing tongue member 144 which itself encompasses T-bar member 158 is illustrated in FIG. 3. In use, hitch 30 may be extended longitudinally forwardly, by sliding hitch 30 within tongue brace 132 such that rear hole 152 is fixed via eleventh pin 172 in alignment with hole 138 of tongue brace 132. In this manner, hitch 30 may be attached to a towing vehicle (not shown) for towing cart 10.

In certain situations, towing is not practical or available. In these situations, T-bar 32 is used to physically push or pull the cart. However, the location of T-bar 32 in use is different from the location of T-bar 32 in storage. As may be recalled from above, in its storage position, front end 162 of T-bar member 158 is inserted into rear end 148 of tongue member 144. To prepare T-bar 32 for use, T-bar 32 is completely withdrawn by pulling it free from rear end 148 of tongue member 144. Then, front end 162 of T-bar member 158 is inserted into spacing upright member (or brace) 24. Because spacing upright member 24 is made from 1 inch square tube and T-bar member 158 of T-bar 32 is made from ¾ inch square tube, T-bar 32 slides easily into spacing upright (brace) member 24. When hole 166 of T-bar member 158 of T-bar 32 is aligned with the hole in spacing upright (brace) member 24, fifth pin 54 is inserted through both holes and fixes T-bar 32 in place relative to cart 10. The upward angle assumed by spacing upright (brace) member 24 is therefore also assumed by T-bar 32 and permits the height of T-handle 160 to assume a comfortable position, without the necessity of stooping or reaching by a user.

In use, to render cart 10 operable from its collapsed state, a user will grasp upper deck 12 and simply pull upper deck 12 upwardly and away from lower deck 14. As upper deck 12 moves upwardly, first, second, third, and fourth upright members 16–22 pivot clockwise about sixth, seventh, eighth, and ninth U-shaped connectors 104–110 which are attached to lower deck 14, and pivot counterclockwise about first, second, third, and fourth U-shaped connectors 36–44 which are attached to upper deck 12. Upon having first, second, third, and fourth upright members 16–22 reach a vertical position, the user releases upper deck 12 and then grasps and rotates spacing upright member (brace) 24 about tenth U-shaped connector 112 until the exposed hole in spacing upright member 24 is aligned with the hole in fifth U-shaped connector 44. Then, the user releases spacing upright member 24 and inserts fifth pin 54 through both the hole in spacing upright member 24 and the hole in fifth U-shaped connector 44. Because spacing upright member 24 is longer than upright members 16–22, the radius of curvature of spacing upright member 24 is longer than that of upright members 16–22. Accordingly, upper deck 12 is prevented from rotating in any direction when fifth pin 54 fixes the free end of spacing upright member 24 to upper deck 12, as the incompatible radius of curvature of the spacing upright member 24 as compared to the other upright members 16–22 make it impossible for simultaneous rotation of all members 16–24. Thus, cart 10 may assume the dimensions of 42½×7×27½ inches when said upper deck has rotated towards the lower deck 14 to assume the smallest possible dimension.

It should be noted that when T-bar 32 is in use, the assembly procedure is somewhat modified. Specifically, The user releases spacing upright (brace) member 24, inserts T-bar 32 into spacing upright (brace) member 24 until the respective holes are aligned, additionally aligns the hole in fifth U-shaped connector 44, and finally inserts fifth pin 54 through three holes simultaneously, namely, the hole in spacing upright (brace) member 24, the hole 166 in T-bar member 158 of T-bar 32, and the hole in fifth U-shaped connector 44.

It should also be noted that if first, second, third, fourth, sixth, seventh, eighth, ninth, and tenth pins 46–52 and 114–122 respectively are of the nut and bolt type and are relatively tight, the upper deck 12 and the spacing upright member 24 will not move when released by the user. Accordingly, it should be pointed out that the body of cart 10 may be erected with only one hand.

Therefore, by way of example, the cart 10 of the present invention is ideally suited for activities such as deer hunting because of the ease of storage and assembly. In addition, hitch 30 allows cart 10 to be loaded with hunting equipment and towed by an all terrain vehicle. As with some hunting areas, all terrain vehicles are barred past certain points, and thus cart 10 may be unhitched from the all terrain vehicle and pushed to the deer stand. Moreover, if the hunter is successful, cart 10 may be employed to haul a deer out of the woods. For similar reasons, cart 10 of the present invention is useful in other hunting venues such as duck hunting.

In another use, cart 10 may be equipped with a stretcher-like attachment placed on top of upper deck 12 and used to transport patients to and from an ambulance or other emergency medical vehicle.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the lengths of the various segments of the body of cart 10 may be freely varied, as such lengths were provided for example only and not in a limiting sense. In addition, the cutouts of wheel mounts 92–100 were described as having certain geometries which could also be varied. Thus, the breadth and scope of the present invention should not be limited by any of the above-described exemplary embodiments, but should be defined only in accordance with the following claims appended hereto and their equivalents.

What is claimed is:

1. A collapsible cart, comprising:

an upper deck;

a lower deck;

a plurality of spacing members of equal length, each of said plurality of spacing members having a first end pivotally connected to said upper deck and a second end pivotally connected to said lower deck;

a removable pin;

a brace member having a first end, a second end, and a length greater than the length of said plurality of spacing members, said brace member being removably connected by said removable pin to said upper deck and pivotally connected to said lower deck, wherein said upper deck may rotate about said plurality of spacing members when said removable pin is removed, and wherein said upper deck does not rotate about said plurality of spacing members when said removable pin removably connects said brace member to said upper deck.

2. A collapsible cart according to claim 1, wherein said cart assumes the dimensions of 42½×7×27½ inches when said upper deck has rotated towards said lower deck to assume the smallest possible dimension.

3. A collapsible cart according to claim 1, wherein said cart further comprises:

said lower deck having an underside;

a tongue brace extending across and connected to said underside of said lower deck; and a hitch having a front portion and a rear portion, said rear portion being disposed within said tongue brace.

4. A collapsible cart according to claim 3, wherein said cart further comprises:

a t-bar having a front portion and a rear portion, said front portion disposed within said rear portion of said hitch and within said tongue brace.

5. A collapsible cart according to claim 4, wherein said cart further comprises:

said t-bar having a handle portion; and a cellular cushion disposed padding on said handle portion of said t-bar.

6. A collapsible cart according to claim 5, wherein said cellular cushion comprises foam.

7. A collapsible cart according to claim 1, wherein said plurality of upright members comprises four upright members.

8. A collapsible cart according to claim 1, wherein said lower deck comprises:

a first side and a second side;

first and second wheel mounts connected to said first side of said lower deck;

third and fourth wheel mounts connected to said second side of said lower deck;

a first wheel connected to and disposed between said first and second wheel mounts on said first side of said lower deck; and a second wheel connected to and disposed between said second and third wheel mounts on said second side of said lower deck.

* * * * *